March 19, 1963 P. N. ARMSTRONG ET AL 3,081,939

CARD PROCESSING APPARATUS

Filed Jan. 28, 1957 3 Sheets-Sheet 1

INVENTORS:
Philip N. Armstrong
Minoru T. Endo

By Smyth & Roston

Attorneys

March 19, 1963 P. N. ARMSTRONG ET AL 3,081,939

CARD PROCESSING APPARATUS

Filed Jan. 28, 1957 3 Sheets-Sheet 2

INVENTORS:
Philip N. Armstrong
Minoru T. Endo

By Smyth & Roston

Attorneys

March 19, 1963 P. N. ARMSTRONG ET AL 3,081,939

CARD PROCESSING APPARATUS

Filed Jan. 28, 1957 3 Sheets-Sheet 3

INVENTORS:
Philip N. Armstrong
Minoru T. Endo

By Smyth & Roston
Attorneys

United States Patent Office 3,081,939
Patented Mar. 19, 1963

3,081,939

CARD PROCESSING APPARATUS

Philip N. Armstrong, Santa Monica, and Minoru T. Endo, Los Angeles, Calif., assignors to Magnavox Company, Los Angeles, Calif., a corporation of Delaware Filed Jan. 28, 1957, Ser. No. 636,812
13 Claims. (Cl. 235—61.11)

The invention relates to a system and apparatus for handling and processing a multiplicity of information storage cards.

The invention is more particularly concerned with apparatus in which information storage cards are transported on a suitable transporting medium for processing and in which the cards so transported are guided on the transporting medium into predetermined relationship with the processing means of the apparatus.

In most present day types of data processing systems, the data to be processed is stored on a plurality of information storage cards. The various items are recorded on the individual cards in the form of hole patterns, or by means of dots or other indicia of magnetic material, or in any other appropriate manner.

The information cards are thereafter stored in stacked relationship in suitable racks or holders. In one form of data processing system, vacuum pressure rotatable drums are used as the transporting media for the information storage cards, and in such systems the card holders are positioned to have their respective mouths disposed adjacent the peripheral surfaces of the corresponding ones of the drums.

A vacuum pressure is provided at the peripheral surfaces of the drums, and this pressure serves to retain the cards firmly and rigidly on such peripheral surfaces while they are being transported. Automatically controlled transfer mechanisms are associated with the various card holders, and these mechanisms are controlled to feed the cards selectively from the card holders to the peripheries of the various drums, and vice versa.

The data or information may be recorded on each information storage card in the form of a series of magnetic dots, as mentioned above. These dots may, for example, have one magnetic polarity to indicate the integer "1," and they may have the opposite magnetic polarity to indicate the integer "0." The dots are arranged on each card in the form of adjacent transverse columns individually corresponding to different "positions" of the particular card. Then, the series of "1's" and "0's" in any particular column may be made to represent a multi-digit binary number.

In processing the cards described above, it has been the practice to provide a plurality of electro-magnetic transducer heads adjacent the transporting medium, with one transducer being provided for each dot in the various columns of each card. These transducers in usual known manner scan the cards either to read the information already recorded on the cards or to record new information.

A problem has arisen in the past in recording the more complex multi-digit binary numbers on the information storage cards. These more complex binary numbers require a relatively large number of dots at each position of the card and, in the prior art systems, this necessitated an unduly large number of individual transducer heads to process the cards. This large number of transducer heads not only represented a relatively large monetary outlay, but also created mounting difficulties in that it was found impractical to provide such a large number of effective transducer heads in the space usually available in data processing systems.

One concept of the present invention provides that the number of transducer heads required for a particular processing operation may be materially reduced. This reduction is made possible by the inclusion of guiding members in the apparatus of the invention, and of providing for a multi-pass operation of the cards past the transducer heads. The cards are shifted by the guiding members in successive passes so as to present different dots to the transducer heads for each such pass.

Copending application Serial No. 600,975 filed July 30, 1956, now Patent No. 2,883,189, for Loren R. Wilson discloses and claims an improved vacuum pressure rotatable drum assembly for transporting the information storage cards. In the Wilson apparatus, the peripheral edges of the drum are undercut to lessen the requirement of close tolerances between the drum and a supporting table top, and to facilitate the feed of the cards to its peripheral surface. This structure is fully described in the copending applicaiton and will be described in some detail in the subsequent specification. The apparatus of the present invention may conveniently incorporate the improved transporting drum of the copending application. The apparatus of the invention further provides that cards transported by such a drum will be accurately and precisely guided in a manner to be described past the transducer heads used in the card processing system.

In the drawings:

FIGURE 1 is a top plan view illustrating in schematic form the improved apparatus of the present invention, and showing a rotatable vacuum transporting drum for receiving cards from an appropriate card holder and for transporting such cards past a series of transducer heads for processing purposes, the illustrated apparatus also incorporating guide members which control the axial disposition of the cards on the periphery of the transporting drums for the reasons outlined above and which will be described in more detail subsequently;

FIGURE 2 is a view partly in section and substantially on the line 2—2 of FIGURE 1 and illustrating in further detail the construction of the vacuum transporting drum shown in FIGURE 1 and the disposition of the drum relative to a card holder included in the assembly;

FIGURE 3 is a perspective fragmentary view on a somewhat enlarged scale of the improved apparatus of the present invention, and illustrating in particular an appropriate transducer means associated with the vacuum transporting drum and a guide structure adjacent the transducer means for directing the cards on the periphery of the drum into a desired operative relationship with the transducer means;

Figures 1, 3:
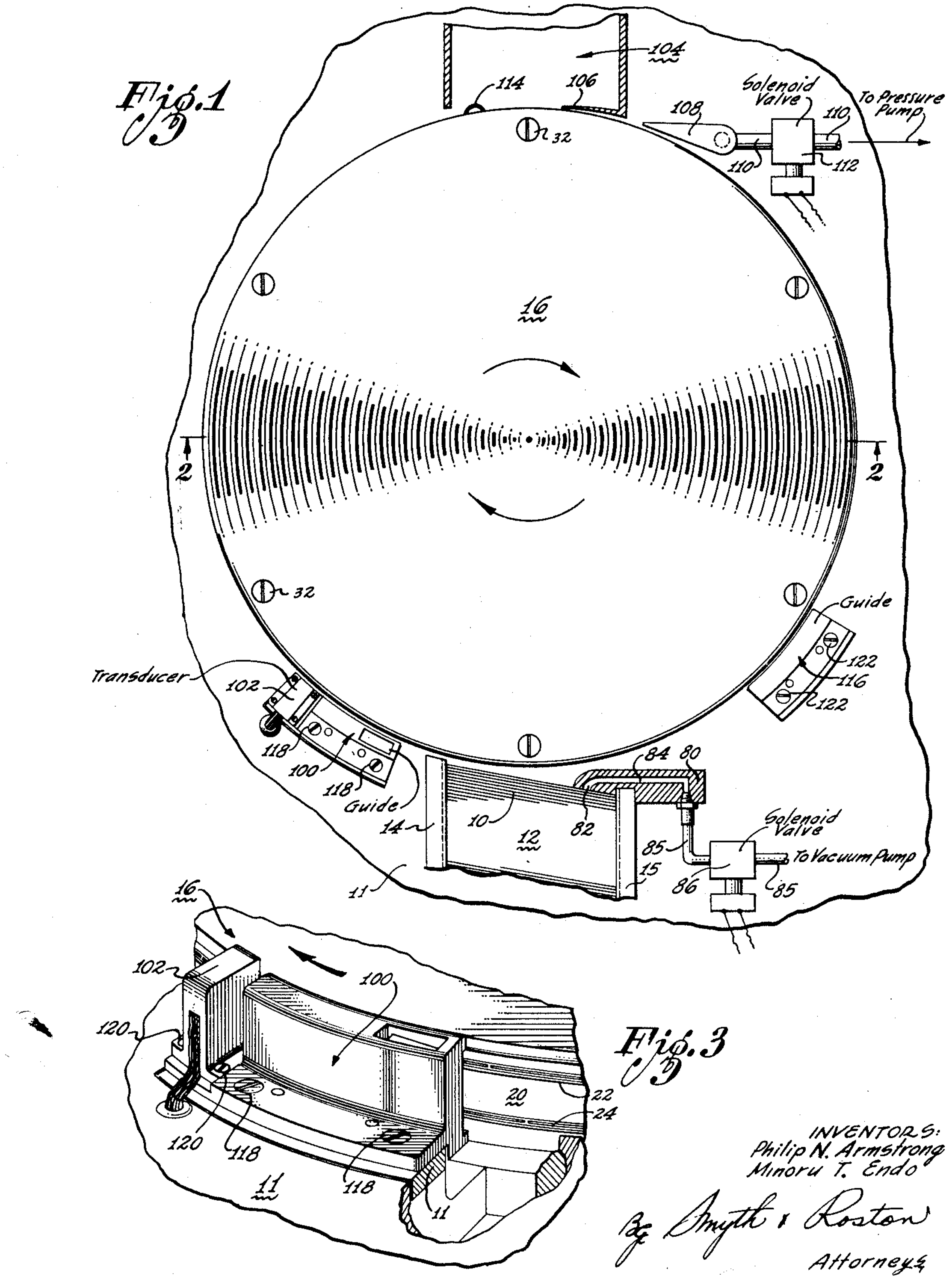

In the embodiment of the invention shown in FIGURES 1 to 9, inclusive, a plurality of information storage cards 10 are disposed in a card holder 12 at a feeding station of the system. The card holder is formed by a pair of parallel walls 14 and 15, and these walls extend along the top 11 of an appropriate supporting table. The walls 14 and 15, and the table top 11 are disposed so that the cards 10 may be held substantially vertically and in a stacked condition, as shown, and with the leading face of the leading card in essentially tangential relationship with the periphery of a rotatable drum indicated generally at 16. The cards extend between the walls 14 and 15, and they are held endwise with their lower edges resting on the table top 11. As will be described in detail subsequently, the drum 16 is constructed to be able to withdraw the cards in succession from the card holder 12 for movement on its periphery.

Figures 2, 4A:
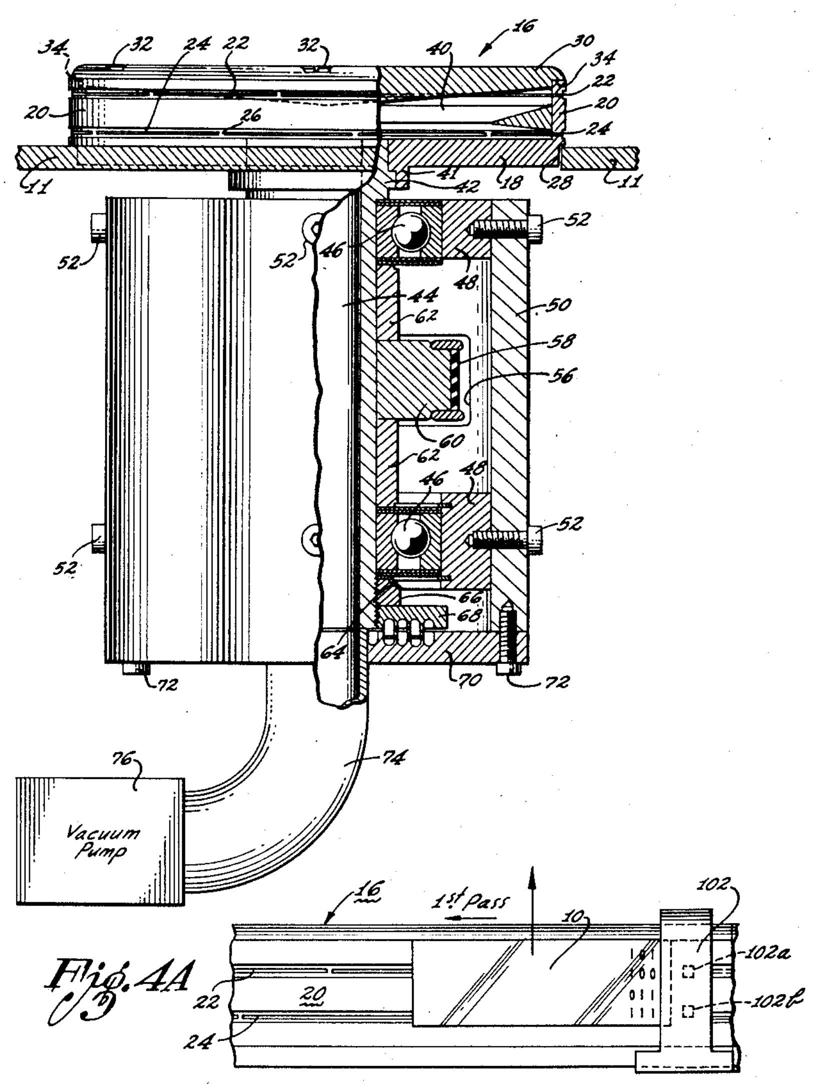
FIGURES 4A and 4B are fragmentary schematic representations of the peripheral surface of the vacuum transporting drum of FIGURES 1, 2 and 3 and showing the disposition of a particular information storage card transported by that drum and the relationship of that card with the transducer heads of the system in succeeding passes.

The drum 16 is rotatably mounted on the table top 11, and as shown particularly in FIGURE 2, is composed of a lower section and an upper section. The constructional details of the drum, such as shown in FIGURE 2, are similar to those disclosed and claimed in the copending Wilson application referred to above.

The lower section of the drum includes a disc-like bottom portion 18 and an annular side portion 20, these portions being integral with one another. A pair of axially spaced peripheral orifices 22 and 24 extend through the side portion 20. Each of the peripheral orifices is discontinuous in that it is interrupted at selected intervals about its periphery by ribs 26 integral with the side portion 20. The integral ribs 26 are staggered so that those interrupting the orifice 22 are displaced with respect to those interrupting the orifice 24. This staggering of the ribs is so that the orifices will not weaken the integral characteristics of the side portion 20 any more than is necessary.

The disc-like bottom portion 18 of the lower section is undercut as shown at 28. This enables the table top 11 to extend beyond the outer limits of the side portion 20. Therefore, even without excessively close tolerances between the edge of the table top 11 and the rotating surface of the drum 16, the cards supported endwise on the table top in the stack 12 have no tendency to slip down between the table and the drum and become misplaced and damaged.

The upper section of the drum 16 is in the form of a disc-like member 30 which engages the annular side member 20 of the lower section. The upper section 30 forms an enclosure with the lower section of the drum, with the upper section being parallel to the disc-shaped bottom portion 18 of the lower section. The upper section is held in place on the side portion 20 by a series of screws 32. The upper section 30 is undercut as shown at 34.

When one of the cards 10 is fed from the holder 12 to the periphery of the drum 16, it is held by vacuum pressure on the outer peripheral surface of the annular side portion 20 in a manner to be described. It is desirable that the cards be fed to this peripheral surface in an accurately oriented position so that they may be properly processed in the system, as will be described. The walls 14 and 15 of the stack 12 cooperate with the table top 11 to direct the cards to the peripheral surface of the portion 20 with a displacement towards the lower side of the drum 16, for reasons to be described.

A deflector ring 40 is supported within the interior of the drum 16 in press-fit with the inner surface of the annular side portion 20. This deflector ring is tapered toward the center of the drum to prevent turbulence and to provide a streamlined path for air that is drawn in through the orifices 22 and 24. Moreover, the under surface of the upper section 30 has a convex shape. This convex shape cooperates with the deflector ring 40 in providing a smooth path for the air drawn in through the orifices 22 and 24.

The portion 18 of the lower section of the drum 16 contains a central opening which is surrounded by an annular collar 41. The collar 41 fits on a further collar 42 provided at one end of a hollow shaft 44. The drum 16 is supported on a shoulder formed by the collar 42, and the end of the shaft 44 extends into the opening of the portion 18 in friction-fit with that portion. Therefore, rotation of the hollow shaft 44 causes the drum 16 to rotate. Also, the interior of the shaft 44 communicates with the interior of the drum.

Bearings 46 are provided at opposite ends of the shaft 44, and these bearings engage bushings 48, the bushings being secured to a housing 50 by a series of studs 52. An arcuate opening 56 is provided in the housing 50 between the bearings 46. This opening enables a drive belt 58 to extend into the housing and around a pulley 60. The pulley 60 is mounted rigidly on the shaft 44 between the bearings 46, and it is held against axial movement on the shaft by sleeves 62. This enables the shaft 44 and the drum 16 to be rotated by a suitable motor (not shown) which is coupled to the pulley 60 by the drive belt 58.

The bearings 46 and the sleeves 62 are held on the shaft 44 by a nut 66. The nut 66 is screwed on a threaded portion at the bottom of the shaft and a lock washer 64 is interposed between it and the lower bearing. A sealing disk 68 is also screwed on the threaded portion at the bottom of the shaft 44. The sealing disk 68 operates in conjunction with a bottom plate 70 to inhibit the movement of air between the interior of the housing 50 and the interior of the hollow shaft 44 when a pressure differential exists between the housing and the shaft.

The bottom plate 70 is secured to the housing 50 by a series of studs 72, and the bottom plate has a central circular opening. A hollow conduit 74 extends into the opening in friction-fit with the plate 70. The conduit 74 is axially aligned with the hollow shaft 44 so that air may be exhausted from the hollow interiors of the shaft and the conduit by a vacuum pump 76. The vacuum pump may be of any suitable known construction and, for that reason, is shown merely in block form.

The vacuum pump 76 draws air in through the orifices 22 and 24, through the interior of the drum 16, down the shaft 44 and through the conduit 74. This creates a vacuum pressure at the outer peripheral surface of the annular portion 20 of the lower section of the drum 16. The deflector ring 40 and the convex underside of the disc-like upper section 30 assures that the air will flow smoothly and with a minimum of turbulence.

The cards are controllably fed from the card holder 12 to the periphery of the drum 16 by any suitable transfer mechanism. The particular mechanism illustrated in FIGURE 1 is similar in some respects to that disclosed and claimed in copending application Serial No. 552,506 filed December 12, 1955, now Patent No. 2,927,791, in the name of Hans M. Stern and assigned to the assignee of the present application.

The illustrated transfer mechanism includes a retainer 80 which is shown in sectional form and which extends across a portion of the mouth of the card holder 12 from the leading wall 15 of the holder with respect to the direction of rotation of the drum 16. The retainer contacts the trailing portion of the front surface of the leading one of the cards 10 stacked in the holder. The retainer is provided with one or more orifices 82 in its contacting surface. These orifices exert a vacuum pressure against the leading card to retain the card in the card holder 12 against the pressure exerted on the card by the vacuum pressure at the peripheral surface of the drum 16.

Conduits such as the conduit 84 extend through the retainer 80. These conduits communicate with an air feed line 85 leading to a solenoid actuated valve 86. The solenoid valve 86 may have any known construction and closes when an energizing current is passed through its energizing winding. The feed line 85 is connected to a suitable vacuum pump which may be the vacuum pump 76 shown in FIGURE 2.

The vacuum pressure at the orifices 82 can be controlled by energizing and deenergizing the solenoid actuated valve 86. Therefore, by controlling the current flow in the solenoid portion of the valve 86, the transfer of cards from the card holder 12 to the peripheral surface of the drum 16 can be controlled. That is, the solenoid portion of the valve 86 may be energized for an interval long enough to permit the leading card from the card holder to be released to the drum 16. The solenoid may then be de-energized to recreate the vacuum pressure at the orifices 82 so that the next succeeding card is held in the card holder 12 until the solenoid is again energized.

Therefore, in the manner described above, the cards 10 in the card holder 12 may be selectively fed to the peripheral surface of the drum 16, and this may be achieved by controllably energizing the solenoid actuated valve 86. The cards transferred in this manner to the periphery of the drum 16 are transported by the drum through a guide member 100 which will be described in greater detail. The cards are then transported past a transducing means 102 which, includes a series of individual axially spaced transducer heads as will be further described.

The cards are then transported by the drum 16 to a card holder 104 which is included in a stacking station of the system. The card holder 104 and its associated transfer mechanism may have a construction similar to the construction of the stacking stations shown in FIGURES 4, 4A and 4B of copending application Serial No. 596,222, filed July 6, 1955, now Patent No. 2,988,216, for Robert M. Hayes et al.

As fully described in the copending application, the transfer mechanism associated with the card holder 104 is controllable so that the cards transported by the drum 16 may either be deposited in that holder, or they may be carried past the holder and back around the drum. To achieve this purpose, the card holder 104 has a throat member 106 extending from its trailing wall toward its leading wall. The throat member 106 is tapered at its forward end to facilitate the transfer of cards from the drum 16 to the card holder 104. The throat member 106 is so shaped and positioned that the cards on the periphery of the drum 16 move with the drum past the card holder 104, and without being transferred to the card holder, as long as no lifting force is exerted against the cards. Such a lifting force can be exerted, however, by the passage of air under pressure through a lifter 108. When such a flow of air is established through the lifter, the leading edge of a card on the drum 16 coming under the influence of this flow is moved away from the periphery of the drum. This allows the throat member 106 to come between the particular card and the drum 16, and causes the card to be positioned on the throat member 106.

The lifter 108 has a tapered configuration, and it is generally symmetrical about a line tangential to the periphery of the drum 16 at a position displaced slightly from the throat member 106 in the counter-clockwise direction. The narrow end of the lifter is near the periphery of the drum 16 at a position displaced slightly in the direction of rotation from the trailing wall of the card holder 104.

The lifter 108 has a hollow interior and it has a series of orifices at its leading end. A feed line 110 is coupled to the rear end of the lifter, and this line is coupled to a suitable pressure pump not shown. A solenoid actuated valve 112 is disposed in the line 110 to control the flow of air to the lifter 108 in known manner. Whenever the solenoid portion of the valve 112 is energized, the valve is opened so that the lifter 108 emits a stream of air under relatively high pressure. This stream of air meets a card transported by the drum to the output stack 104 and causes the leading edge of that card to rise up in the described manner, so that the card rides up and over the throat member 106.

A stationary pawl member 114 is positioned adjacent the periphery of the drum 16 near the leading wall of the card holder 104. The pawl member 114 has a bulged intermediate portion, and the cards transported by the periphery of the drum 16 ride up and over this member. Should a card become positioned on the throat member 106 due to the action of the lifter 108, the trailing edge of such a card would project over the top of the pawl 114. Then, succeeding cards ride up over the member 114 but under the card positioned on the throat 106. Should a succeeding card be one to be deposited in the card holder 104, its leading edge also would become positioned on the throat 106 under the preceding card and it would deposit the preceding card into the card holder 104.

The construction and operation of the lifter 108 and the associated pawl 114 and other members are fully disclosed in copending application Serial No. 562,154 filed January 30, 1956, now Patent No. 3,016,140 by Stuart L. Peck et al.

A second guide member 116 is positioned adjacent the drum 16 but on the other side of the card holder 12 from the guide member 100. The structural details of the guide member 116 and its function will be described subsequently.

As shown more clearly in FIGURE 3, the guide member 100 is mounted on the table top 11 by means of a series of set screws 118. The transducer means 102 is mounted on the table top by a plurality of screws 120, and the transducer means is adjacent the exit of the guide member 100. The guide member 116 is secured to the table top by means of a plurality of screws 122.

The transducer means 102 includes a series of individual transducer heads (to be described) which are spaced axially with respect to the periphery of the drum 16. The arrangement is such that the individual heads in the transducer means 102 scan alternate ones of the individual magnetic dots in each column of the cards transported by the drum past these heads.

As noted briefly above, a card fed from the card holder 12 to the periphery of the drum 16 is displaced toward the lower side of the drum. Such a card is transported by the drum to the guide member 100. This card engages a tapered lower guiding surface of the guide member 100, and this surface guides and directs the cards slightly upward with respect to the peripheral surface of the drum and into a desired operating relationship with the individual heads in the transducer means 102. The transducer heads then process certain alternate dots in each succeeding column of the particular card. The card is then transported around the drum to the card holder 104. The lifter 108 is not energized for this first pass, so that the card is transported by the drum 16 past the card holder 104 and to the guide member 116.

The guide member 116 has a tapered lower surface which engages the card and moves it axially on the drum 16 so that it is displaced toward the top side of the drum. The card is then transported past the card holder 12, and it is again introduced to the guide 100. Now, the upper surface of the guide 100 engages the card, and this upper surface is tapered so that the card is shifted slightly downwardly on the drum 16 before it is directed to the transducer heads in the transducer means 102. For this second pass, these transducer heads of the transducer means 102 scan and process other dots in the columns of the cards, these latter dots being interposed between the dots previously processed in the first pass. The above action is more clearly shown in FIGURES 4A and 4B. As described previously in the present specification, the data to be scanned is recorded on the cards 10 in a series of columns of discrete areas or dots of one magnetic polarity or the other. Those dots having one magnetic polarity may, for example, represent the integer "1," and those having the opposite magnetic polarity may represent the integer "0." Such magnetic representations are shown schematically in FIGURES 4A and 4B by a series of "1's" or "0's" arranged on a particular transported card 10 in rows along the card so as to form a series of transverse columns across the card.

The transducer means 102 may comprise a plurality of individual transducer heads, and two of such heads are indicated by the dotted blocks 102*a* and 102*b* in FIGURE 4A. These heads may have any known and suitable construction.

The representation of FIGURE 4A is intended to show one of the cards 10 on the first pass of the card from the card holder 12 through the guide member 100 to the transducer heads 102*a* and 102*b*. As described above, the card is transferred to the drum 16 from the card holder 10 with an axial disposition that is displaced toward the lower side of the drum. Then this card engages the guide member 100, and the lower tapered surface of the guide member moves the card slightly upwardly in an axial direction on the periphery of the drum 16 to align the card precisely with the transducer heads 102*a* and 102*b*. This alignment is such that these transducer heads scan, for example, two alternate rows of magnetic information on the card 10.

Figure 4B:
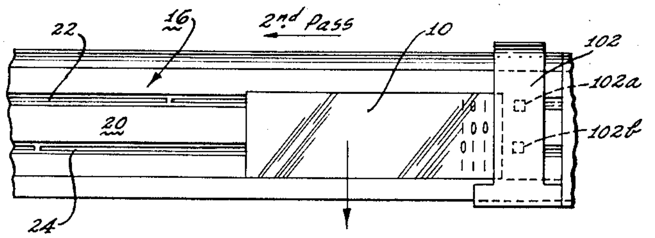

It should be pointed out that the four rows of magnetic information on the card illustrated in FIGURES 4A and 4B, and the corresponding two transducer heads are chosen merely to clarify the description. In the usual commercial apparatus, many more rows of information would normally be recorded on the cards, and more transducer heads would be required to scan these additional rows. In each instance, the invention provides that only half the number of transducer heads is required to scan rows as compared with the prior art systems.

After the card 10 has passed the transducer means 102 so that a first two of its rows are scanned respectively by the heads 102*a* and 102*b*, the card is transported in the described manner past the output stacking station and through the guide member 116. Because the card is displaced toward the lower side of the drum 16 for its first pass, it engages the lower tapered surface of the guide member 116. The guide member 116, now shifts the card axially and in an upward direction, so that it is displaced toward the upper side of the drum. The card therefore engages the upper tapered surface of the guide member 100 for its second pass, and this surface moves the card downwardly by a slight amount to precisely align its other two rows of information with the respective heads 102*a* and 102*b* of the transducer means 102.

This latter disposition of the card 10 for its second pass is shown, for example, in FIGURE 4B. Then, in the second pass, the alternate rows of magnetic information are scanned by the transducer heads 102*a* and 102*b*. The card is then transported to the card holder 104, and the lifter 108 is controlled to deposit the card in that card holder in the described manner.

The structural details of the guide member 100 are shown in FIGURES 5 to 8, inclusive. As shown, for example, in FIGURE 5, this guide member has an upper shoulder portion 200 extending along its length. The lower surface of this shoulder forms the upper guiding surface referred to previously. The lower surface of the shoulder portion has a tapered configuration adjacent the left hand end of the guide member 100, so that it directs cards entering the guide member from the left in FIGURE 5 downwardly a slight amount and in the described manner. To prevent any tendency for the cards to become skewed on the periphery of the drum 16 as they are shifted by the upper shoulder 200 of the guide member 100, a spring-loaded element 202 is provided. This element is positioned at the left hand end and adjacent the lower side of the guide member 100. As a card is moved downwardly a slight amount by the upper shoulder portion 200, its leading lower corner engages the element 202, and this element serves resiliently to rotate the card in a counterclockwise direction and hold it against the lower surface of the shoulder portion 200. Although this lower surface of the upper shoulder portion 200 is tapered adjacent the left hand entrance to the guide member 200, this surface gradually loses its taper to the right in FIGURE 5, and it becomes parallel to the planes of the top and bottom of the drum 16. This enables the card to be properly oriented on the periphery of the drum 16, but to be slightly displaced downwardly from its original position on that periphery.

The spring-loaded element 202 includes a treadle 206. The leading end of the treadle 206 has a rolled-over configuration and supports a coil spring 208. One end of the spring 208 rests against the upper surface of a lower shoulder member 204. The other end of the spring 208 engages the upper surface of the treadle 202. The upper surface of the lower shoulder member forms the lower guiding surface of the guide 100.

The treadle 202 includes an ear 210 which extends in the plane of the treadle into a slot 211 in the face of the guide member 100. The ear 210 has a slot 213 extending through it, and an upright post 212 extends through this slot. The post 212 is rigidly mounted in the slot 211 in the face of the guide 100.

A second coil spring 214 is supported on the post 212. One end of the coil spring 214 engages the guide member 100, and the other end of this coil spring engages a bent-over lug 216 on the treadle 206. The spring 214 serves to pivot the treadle 206 about the post 212 and thereby bias the end of the treadle outwardly from the face of the guide member 100.

Figures 5, 6, 7, 8, 9:
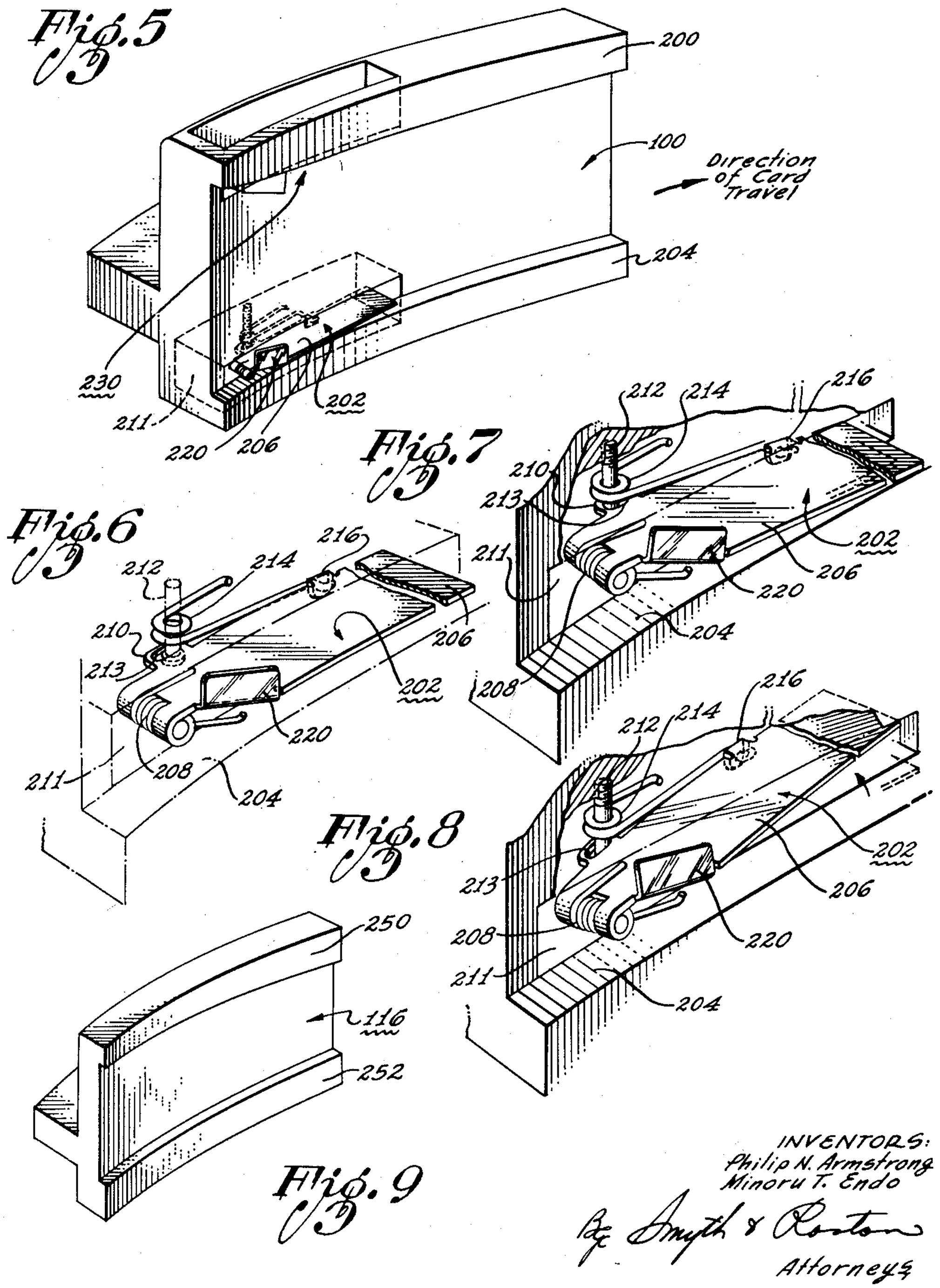
FIGURE 5 is a front perspective view of one of the guide members of FIGURE 1, and shows in particular detail the guiding surfaces and elements included in that member.
FIGURE 6 is an enlarged detailed perspective representation of a spring actuated guiding element included in the guide member of FIGURE 5, and showing this element in a first operative position.
FIGURE 7 is a perspective view of the element of FIGURE 6 showing the element in a second operative position.
FIGURE 8 is a perspective view of the element of FIGURE 6 showing the element in a third operative position.
FIGURE 9 is a front perspective view of a second guiding member used in the system of FIGURE 1.

Now, when a card enters the left hand end of the guide member 100 in FIGURE 5, it travels along the tapered lower surface of the shoulder portion 200. Therefore, the card is moved axially downwardly of the periphery of the drum 16 in the manner described previously, and the card tends to become slightly skewed. During such motion, the under side of the card moves into engagement with the top surface of the treadle 202. Such engagement tends to pivot the treadle about the end of the spring 214 in the lug 216 from its position of FIGURE 6 to the position shown in FIGURE 7. That is, the left hand end of the treadle tends to be moved downwardly against the compression of the spring 208. However, the spring 208 has sufficient compression to overcome this tendency and to resiliently urge the card upwardly toward the untapered surface of the shoulder portion 200. This accurately aligns the card on the periphery of the drum 16 in its upper axial position for the first pass as shown in FIGURE 4A.

During the second pass of the card, and when it engages the upper surface of the lower shoulder portion 204, the card engages a bentover portion 220 of the treadle 206. Such engagement of the card with the portion 220 causes the guide member 202 to be pivoted about the post 212. This moves the treadle back into the slot 211 formed in the face of the guide member 100 and to the position shown in FIGURE 8. The element 202 is thereby effectively removed from the path of the card, when the card is in its second pass.

The card in its second pass engages the upper surface of the lower shoulder portion 204 as it enters the guide member 100 from the left in FIGURE 5. The shoulder portion 204 has generally the same configuration as the shoulder 200. The upper surface of the shoulder 204 is tapered to the left in FIGURE 5 at the left end of the guide 100, and it loses its taper towards the right end of the guide. The card, therefore, is moved axially upwardly by a slight amount and is slightly skewed by this tapered upper surface of the shoulder 204. The card now engages a spring-loaded element 230 which may be similar in its construction to the element 202. The element 230 is positioned at the top of the guide 100 towards its left end in FIGURE 5. This element serves to bias the card down against the un-tapered portion of the upper surface of the lower shoulder 204 so that the card will be properly aligned and oriented on the periphery of the drum 16 in its lower axial position.

The spring-loaded element 230 is moved out of the way by the card during its first pass. Such movement of the element 230 is similar to the control of the element 202 by the card in its lower position and during its second pass.

In the manner described above, therefore, the cards may be accurately guided to their first and second axial positions on the periphery of the drum 16 by the guide member 100 and its associated elements. In the manner described, the proper orientation of the cards on the drum is maintained during such guiding operations.

The guide member 116 is shown in FIGURE 9. As noted previously in the description, the upper shoulder portion only of this guide member has a tapered surface, this upper shoulder portion is designated as 250. The lower shoulder 252 of the guide 116 is not tapered, and the exit to the guide has a width corresponding to the width of the cards. This enables the cards to be moved by the upper guide member 250 axially downwardly a slight amount into engagement with the lower guide member 252, and for the cards to be properly aligned and oriented on the periphery of the drum 16 at their new axial position as they emerge from the exit of the guide 116 to the right in FIGURE 9. It is clear, therefore, that the exit of the guide 100 to the right in FIGURE 5 has a width which is slightly greater than the width of the cards so that the cards may have either one or two axial positions as they emerge from that guide, whereas the exit of the guide 116 in FIGURE 9 has a width corresponding to the width of the cards.

In the described manner, the cards from the card holder 12 may be processed by the transducer means 102 with a material reduction in the required number of transducer heads as compared with prior art systems. This desired result is achieved by guiding the cards in the manner described and by permitting the cards to pass a plurality of times past the transducer means.

It should also be noted that the guide member 100 is extremely useful in systems in which a single pass is used. In such systems, the guide member serves to accurately and precisely position and align the cards on the periphery of the drum. This assures that the cards will be transported by the drum in precise axial alignment with the transducer heads of the transducer means incorporated in such systems.

It should be appreciated that the cards can be shifted transversely through different distances than that described above. For example, the cards can be shifted transversely along the drum 16 in FIGURE 1 through an axial distance corresponding to the distance between two or more rows as well as through an axial distance corresponding to the distance between two rows.

It should also be appreciated that apparatus can be included to produce more than two axial shifts in position for the cards. This apparatus can be disposed in contiguous relationship to a single drum or can be disposed in contiguous relationship to two or more drums. The drums can be coupled by gates to obtain the proper transfer of cards between successive drums so that the cards can receive the desired axial shifts in position as they rotate with the drums. In this way, the number of transducer heads required can be reduced even more than the number of heads required in the apparatus described above and shown in the drawings.

Although this application has been disclosed and illustrated with reference to particular applications, the principles involved are susceptible of numerous other applications which will be apparent to persons skilled in the art. The invention is, therefore, to be limited only as indicated by the scope of the appended claims. For example, the term "cards" as used in the claims is intended to include any discrete elements which are able to record information on the elements for subsequent reproduction.

We claim:

1. In a system for processing data on a plurality of information storage cards, such data being recorded on each of such cards in a plurality of different rows, the combination of, a table, a rotatable drum mounted on said table for transporting the cards on its peripheral surface, a plurality of transducer heads mounted on said table and disposed adjacent said drum and axially displaced from one another with respect to the peripheral surface of said drum for processing alternate ones of the data rows on the information cards transported by said drum, guiding means mounted on said table and disposed adjacent said drum and contiguous to said transducer heads, said guiding means controlling the axial position of the cards on the periphery of said drum to cause each of such cards having an axial position displaced toward one side of said drum in the axial direction of the drum to present a first plurality of alternate data rows to corresponding ones of said transducer heads in a first revolution of said drum and to cause each such card to have an axial position displaced toward the other side of said drum to present a second plurality of alternate data rows to corresponding ones of said transducer heads in a subsequent revolution of said drum, and means disposed in coupled relationship to the cards on the drum and in cooperative relationship with the guiding means to act upon the cards for a proper positioning of the cards in the axial direction by the guiding means.

2. In a system for processing data on a plurality of information storage cards, such data being recorded on each of said cards in a plurality of different rows, the combination of, a table, a vacuum pressure rotatable drum on said table for transporting the cards on its peripheral surface, a plurality of transducer heads mounted on said table and disposed adjacent said drums and axially displaced from one another with respect to the peripheral surface of said drums for processing alternate ones of the data rows on the informative cards transported by said drum, first guiding means mounted on said table and disposed adjacent to said drum and contiguous to said transducer heads and provided with tapered configurations at opposite axial ends for progressively adjusting the axial position of the cards on the periphery of said drum to cause each of such cards having an axial position displaced towards a first side of said drum in the axial direction of said drum to present a first plurality of alternate data rows to corresponding ones of said transducer heads in a first revolution of said drum and to cause each of such cards having an axial position displaced toward the other side of said drum to present a second plurality of alternate data rows to corresponding ones of said transducer heads in a subsequent revolution of said drum, and second guiding means mounted on said table and disposed adjacent said drum in angularly displaced relationship to said first guiding means for shifting toward said other side the cards transported by said drum past said second guiding member.

3. The combination defined in claim 2 and which includes means interposed between said second guiding means and said first guiding means for introducing the information storage cards to the periphery of said drum with an axial position displaced toward said first side of said drum.

4. In a system for processing data on a plurality of information storage cards, such data being recorded on each if such cards in a plurality of different rows, the combination of, a vacuum pressure rotatable drum for transporting the cards on its peripheral surface, card holding means disposed in contiguous relationship to said drum for maintaining the cards in stacked relationship, means for producing a vacuum force on the periphery of said drum to obtain a withdrawal of the cards from said card holding means to the periphery of said drum with said cards being displaced toward a first side of said drum in the axial direction of said drum and to retain the card on the periphery of said drum during the drum rotation, a plurality of transducer heads mounted on said table top and disposed adjacent said drum and axially displaced from one another with respect to the peripheral surface of said drum for processing alternate ones of the data rows on the information cards transported by said drum, a first guiding member mounted on said table top and disposed adjacent said drum and contiguous to said transducer heads, said first guiding member being provided with tapered configurations along a pair of axially spaced surfaces with the taper along one of the spaced surfaces being in an opposite direction to the taper along the other spaced surface for providing an adjustment in the axial position of the cards on the periphery of said drum to cause each of such cards having an axial position displaced toward the first side of said drum to present a first plurality of alternate data rows to corresponding ones of said transducer heads and to cause each of such cards having an axial position displaced toward the other side of said drum to present a second series of alternate data rows to corresponding ones of said transducer heads, and a second guiding member disposed adjacent said drum on the opposite side of said card holding means with respect to said first guiding member and serving to shift towards the other side of said drum cards transported by said drum past said second guiding member.

5. In the system set forth in claim 4, means to control the transfer of the information cards to the drum for an initial movement of the cards on the first axial side of the drum past the transducer heads, and in which the second guiding member operates on the cards to move the cards to the other side of the drum for a subsequent movement of the cards past the transducing heads.

6. In the system set forth in claim 4, in which said first guiding member includes an upper guiding surface having a tapered configuration toward the entrance of said guiding member and such surface being parallel to the plane of said drum toward the exit of said first guiding member, and in which said first guiding member includes a lower guiding surface having a tapered configuration at the entrance of said first guiding member and being parallel to the plane of said drum towards the exit of said first guiding member.

7. In a system for processing data on a plurality of information storage cards, such data being recorded on each of such cards in at least a particular row on the card, the combination of: transport means for the cards, transducer means responsive to data in the particular row on the cards on the transport means to process data in such row on the cards, guide means operative upon the cards on the transport means at a position displaced from the transducer means and provided with a first surface extending in the direction of the card transport and having a configuration in this direction for progressively adjusting the positioning of the cards relative to the transducer means in a direction transverse to the direction of card movement, and control means displaced from the guide means in the transverse direction for pressing the transported cards into engagement with the first surface on the guide means for a positioning of the cards in the transverse direction by this surface.

8. The combination set forth in claim 7 in which the control means is spring loaded to provide a controlled pressure against the cards for movement of the cards against the first surface of the guide means.

9. In a system for processing data on a plurality of information storage cards, such data being recorded on each of such cards in at least a particular row on the card: the combination of: transport means constructed to produce a movement of the cards in a looped path, transducer means responsive to data in the particular row on the cards on the transport means to process data on such cards, guide means having first and second guide surfaces spaced from each other by a distance greater than the width of each card and each guide surface being provided with a taper producing a decrease in the distance between the surfaces in the direction of movement of the cards, the guide means being operative upon the transported cards to provide an adjustment by the guide surfaces relative to the transducer means in directions transverse to the direction of movement of the cards, means disposed in coupled relationship to the transport means for providing an initial release of the cards to the transport means for positioning of the cards in the transverse direction by the first guide surface of the guide means, and means disposed in coupled relationship to the transport means for producing a subsequent displacement of the card to provide a positioning of the cards in the transverse direction by the second guide surface of the guide means.

10. A system as set forth in claim 9 in which spring-loaded means are included in the guide means for initially pressing the cards against the first guide surface for positioning by the first guide surface and for subsequently pressing the cards against the second guide surface for positioning by the second guide surface and in which the transport means are movable in a closed loop.

11. In a system for processing data on a plurality of information storage cards, such data being recorded on each such card in at least first and second rows on the card, the combination of: transport means constructed to obtain a movement of the cards, a transducer head disposed relative to the transport means for processing data in the first and second rows on the card, and a guiding member disposed adjacent the transport means at a position before the transducer head in the direction of movement of the cards and provided with a tapered configuration in a direction transverse to the direction of movement of the cards for progressively adjusting the position of the cards in the transverse direction on the transport means to cause each of such cards to present a particular one of the first and second rows to the transducer head.

12. In a system for processing data on a plurality of information storage cards, such data being recorded on each of such cards in at least first and second rows, the combination of: a support member, transport means movable in a closed loop and supported by the support member and constructed to obtain a movement of the cards in accordance with the movement of the transport means, a transducer head mounted on the support member and disposed relative to the transport means for processing data in the first and second rows on the cards transported by the transport means, guiding means supported by the support member and disposed relative to the transport means to control the position of the cards on the transport means in a direction transverse to the direction of movement of the cards to cause each of the cards displaced in the transverse direction toward one side of the transport means to present the first row to the transducer head in a first revolution of the transport means and to cause each such card displaced toward the other side of the transport means in the transverse direction to present the second row to the transducer head in a subsequent revolution of the transport means, and means disposed in coupled relationship to the cards on the transport means and in cooperative relationship with the guiding means to act upon the cards for a proper positioning of the cards in the transverse direction by the guiding means in successive revolutions of the transport means.

13. In a system for processing data on a plurality of information storage cards, such data being recorded on each of such cards in at least one row, the combination of, a vacuum pressure rotatable drum for transporting the cards on its peripheral surface, transducer means disposed adjacent said drum and including a first transducer head disposed with respect to the peripheral surface of said drum for processing data in the data row on the information storage cards transported by said drum, a guide member disposed adjacent said drum for controlling the position of the cards on the periphery of said drum in a direction transverse to the direction of movement of the cards to obtain a particular disposition of the head relative to the row of data on the cards, said guide member being provided with an entrance and an exit and having an upper guiding surface having a tapered configuration towards the entrance of said guide member and such surface being parallel to the plane of said drum towards the exit of said guide member, said guide member having a lower guiding surface having a tapered configuration towards the entrance of said guide member and being parallel to the plane of said drum towards the exit of said guide member, said upper and lower guiding surfaces being axially displaced at the exit of said guide member a distance greater than the width of such storage cards, a first spring-loaded element positioned adjacent said lower guiding surface for biasing the cards upwardly against said upper guiding surface to maintain the cards properly oriented on said drum, a second spring-loaded element positioned adjacent said upper guiding surface for biasing the cards downwardly against said lower guiding surface to maintain the cards properly oriented on said drum, said first spring-loaded element being rendered ineffective by cards displaced towards said lower guiding surface, and said second spring-loaded element being rendered ineffective by cards displaced toward said upper guiding surface.

References Cited in the file of this patent

UNITED STATES PATENTS

| | | |
|---|---|---|
| 2,719,884 | Reed | Oct. 4, 1955 |
| 2,729,136 | Feick et al. | Jan. 3, 1956 |
| 2,752,154 | Nelson | June 26, 1956 |
| 2,792,175 | Amundsen | May 14, 1957 |
| 2,842,362 | Hayes et al. | July 8, 1958 |
| 2,883,189 | Wilson | Apr. 21, 1959 |